M. A. TWITCHELL.
ANIMAL TRAP.
APPLICATION FILED AUG. 18, 1917.

1,327,890.

Patented Jan. 13, 1920.

INVENTOR.
M. A. TWITCHELL
BY Milton L. Crandall
ATTORNEY

UNITED STATES PATENT OFFICE.

MYRON A. TWITCHELL, OF ELK POINT, SOUTH DAKOTA.

ANIMAL-TRAP.

1,327,890.   Specification of Letters Patent.   Patented Jan. 13, 1920.

Application filed August 18, 1917. Serial No. 186,841.

*To all whom it may concern:*

Be it known that I, MYRON A. TWITCHELL, a citizen of the United States, and a resident of Elk Point, in the county of Union and State of South Dakota, have invented certain new and useful Improvements in Animal-Traps, of which the following is a specification.

This invention relates to animal traps.

The invention aims primarily to provide an improved device particularly adapted for entrapping rats and mice.

Another object of the invention is the production of an improved rat and mouse trap inexpensive in production and thoroughly dependable in operation.

Still another object of the invention is the production of an animal trap of the spring jaw type embodying certain novel features whereby the trap may be set without danger of entrapping the fingers of the operator.

With these and other objects in view, the invention consisting in the construction, combination and novel arrangement of parts will be fully understood from the following description, reference being had to the accompanying drawings which form a part of this application and in which like characters of reference indicate corresponding parts throughout the several views, of which,—

Figure 1:
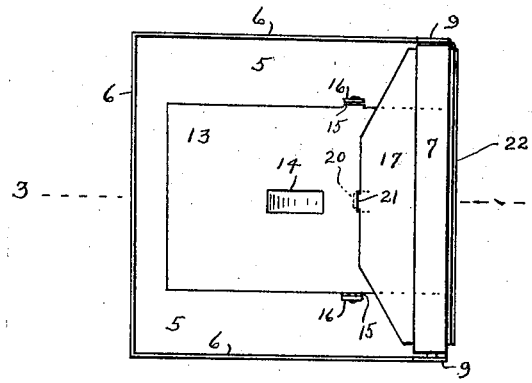
Figure 1 is a plan of a trap constructed in accordance with the invention and in set or open position.

Although I have illustrated and hereinafter described the preferred embodiments of the invention I would not be understood as being limited to the specific structure chosen for illustration for various alterations and modifications in the details of construction and arrangement of parts may be made without departing from the spirit and scope of the invention as defined in the appended claim.

Referring, now, to the illustration, 5, is the base of any suitable form of construction but preferably comprising a sheet metal plate having at its side and front edges upright flanges, 6. At the rear of the base is a substantially U-shaped jaw 7, the free ends of the arms thereof being pivoted on a rod 8, supported by ears 9, formed on the side flanges of the plate. The jaw swings toward and from the plate, 5, to accordingly close and open the trap and is closed with suitable spring mechanism. In the present embodiment the rod, 8, is inclosed by a coil spring 10, having one end thereof engaged with the jaw as at 11, and the opposite end engaged with the plate 12, the spring being stressed to close the jaw.

The jaw is held releasably open by means of a trigger mechanism consisting preferably of a sheet metal plate 13, having a depression 14, for the reception of bait. The plate 13, is comparatively large and the bait retaining portion is positioned at substantially the center of said plate in order that the animal in partaking of the bait will be obliged to step on the plate.

The plate is provided at its sides with depending ears 15, pivoted on suitable bearings 16, on the base plate, 5. When the trap is set the forward end of the plate, 13, is raised and the rear end thereof rests on the spring 10, and the jaw is disposed in a vertical position. The said plate and jaw are held releasably in these positions by means of a plate 17, provided with ears 18, pivoted to and between the arms of the jaw as at 19, a distance above the pivotal points of the arms.

The lower edge of the plate 17, is provided with a short stud, 20, which enters an opening 21, in the plate 13, slightly in the rear of the pivot axis of the plate 13. The rear end of the plate 17, extends upwardly a slight distance as at 22, to prevent entrance of the animals at the rear of the trap and affords convenient means for setting the trap as will hereinafter be made more clear. In setting the trap it is only necessary to draw the jaw upwardly by grasping its cross-member or web with the fingers and while so doing press forwardly with the thumb on the upper end of the plate 17, until the stud 20, enters the opening, 21.

Figure 2:
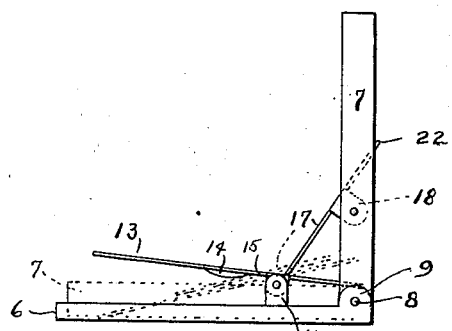
Fig. 2 is a side elevation of the same.
Figure 3:
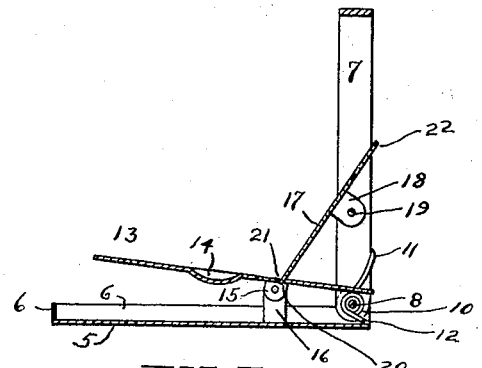
Fig. 3 is a vertical section taken on the line 3—3 of Fig. 1.
Figure 4:
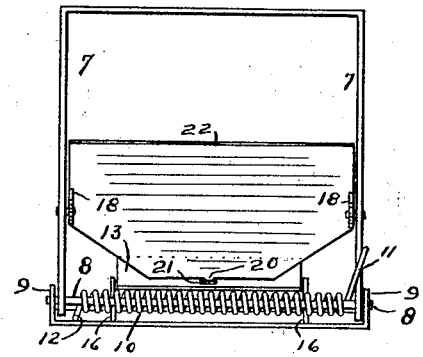
Fig. 4 is a rear elevation of the same.

Obviously, depression of the forward end of the plate 13, releases the jaw and permits the same to be sprung downwardly as indicated by dotted lines in Fig. 2.

Having thus described my invention what I claim as new and desire to secure by Letters Patent of the United States, is,—

An animal trap comprising a base, a U-shaped jaw pivoted thereon to swing toward and from the base to accordingly close and open, yieldable means to force the jaw closed, a trigger plate pivoted between its ends to the base and in front of the jaw, means engageable with the trigger in the rear of its pivot to prevent depression of the trigger below a predetermined point, the trigger being adapted to be baited in front of its pivot, and of such size that the animal for which the trap is intended cannot reach the bait without stepping on said plate, and a latch-plate pivoted between its upper and lower ends to and between the arms of the jaw, and releasably engageable at its lower edge with the trigger slightly in the rear of the trigger pivot, the latch-plate being adapted to be placed in such engagement by opening the jaw and forcing the upper end of the latch-plate forwardly.

In testimony whereof, I have hereunto set my hand this 15th day of August, 1917.

MYRON A. TWITCHELL.